Figure 11:
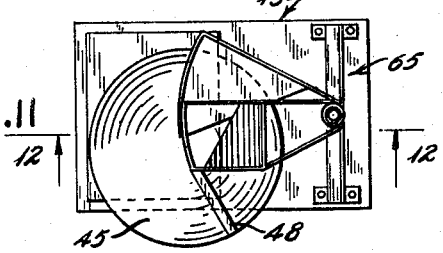

May 11, 1965  P. J. GEERLINGS  3,182,919
DISK TYPE FEED BLENDER AND COMMINUTER
Filed Oct. 25, 1963  3 Sheets-Sheet 1
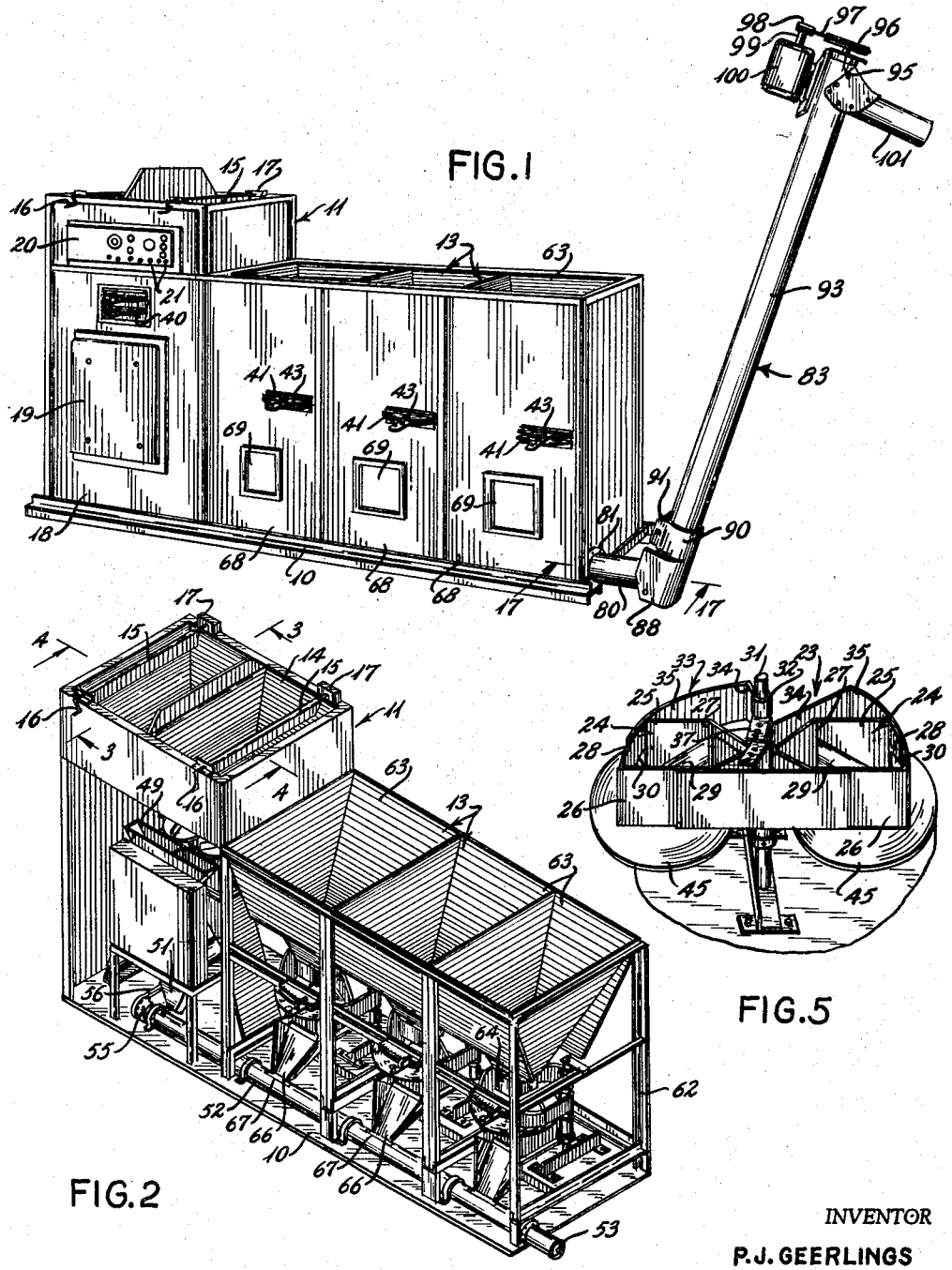
INVENTOR
P.J. GEERLINGS
BY
ATTORNEY May 11, 1965 P. J. GEERLINGS 3,182,919
DISK TYPE FEED BLENDER AND COMMINUTER
Filed Oct. 25, 1963 3 Sheets-Sheet 2

INVENTOR
P.J. GEERLINGS

BY
ATTORNEY

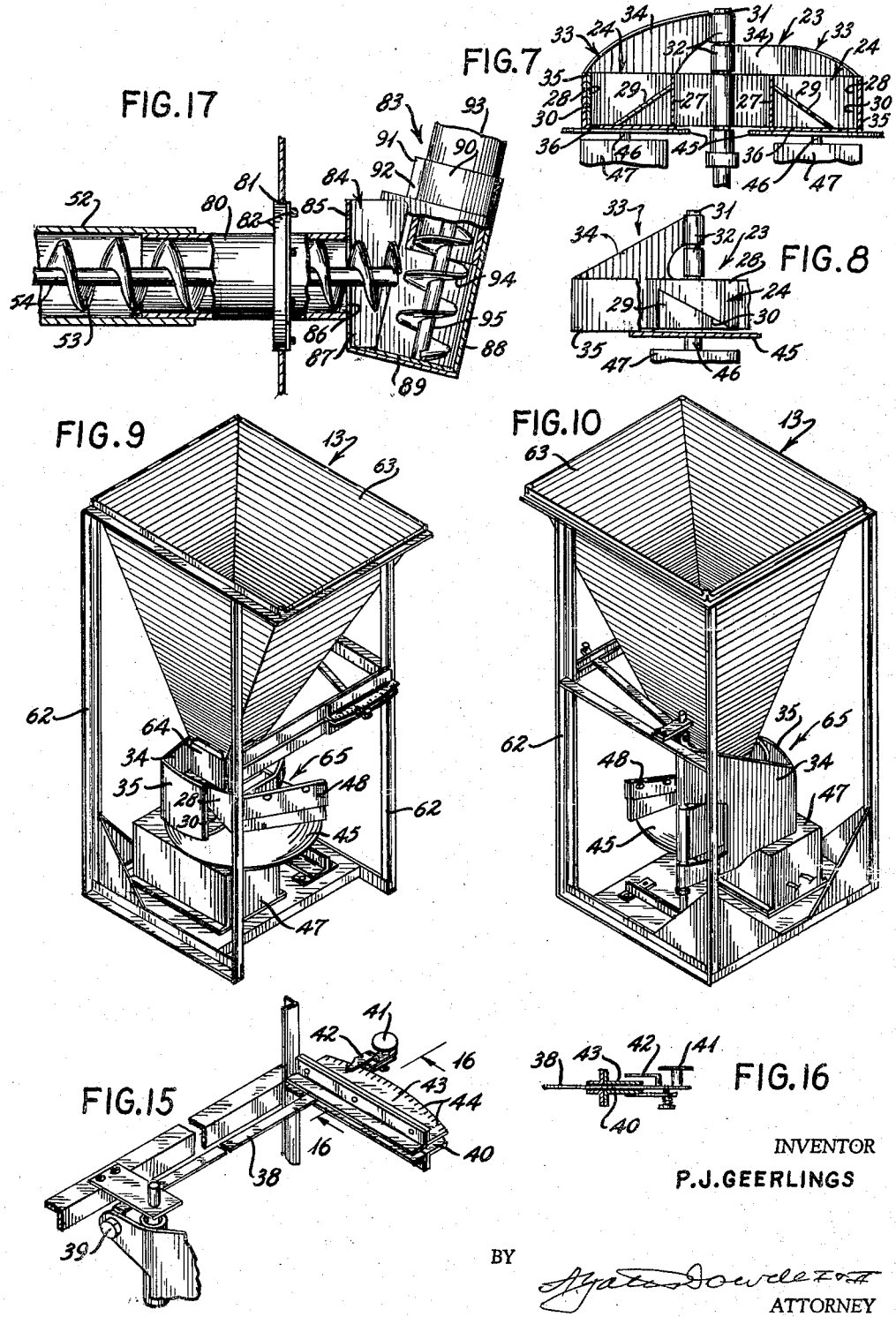

United States Patent Office 3,182,919
Patented May 11, 1965

3,182,919
DISK TYPE FEED BLENDER AND COMMINUTER
Petrus J. Geerlings, 2426 W. 4th St., Waterloo, Iowa
Filed Oct. 25, 1963, Ser. No. 319,032
7 Claims. (Cl. 241—101)

This invention relates to the preparation of feeds for use in the feeding of cattle, or for other purposes, to the way in which the ingredients are combined for preparing feeds, and to apparatus and equipment by which such ingredients are combined or blended to provide feeds of homogeneous, uniform consistency.

The invention relates particularly to apparatus or equipment by which feeds or other substances to be combined can be uniformly blended into a homogeneous mixture of desired nutriment and consistency, and in which the substances used can be in the desired proportions to meet needs and diet requirements.

The present invention is an improvement over my co-pending application Serial No. 47,576 filed August 3, 1960, now Patent No. 3,131,911 issued May 5, 1964.

Heretofore many devices have been utilized for preparing feed for animals such as cattle and horses or the like. However, most of these devices have not been controlled with sufficient accuracy to insure the most efficient blend of materal or to achieve a consistency such that one batch of feed was identical with another batch of feed in the proportions of the desired elements. My co-pending application permitted more accurate control of the flow of material but this structure had certain undesirable features such as size and cost of manufacture which were unacceptable to certain portions of the market.

It is an object of the invention to overcome the objections enumerated and to provide a relatively simple, economical disk type blender having a series of units of any desired number and size which can be connected in side by side relation and which will comminute grains of various types such as corn or the like and combine such grains with granular materials of various types such as meal or the like in exact proportions according to predetermined scientifically prepared formulas.

Another object of the invention is to provide a feed blender which will comminute grain and blend such grain with granular foodstuffs such as meal or the like so that the full nutritive value of the material is released as it is blended.

Still another object of the invention is to provide a disk type feed blender with control means located exteriorly of the blender housing so that the amount of material can be easily and accurately controlled and can be altered during the time that the blender is in operation when a change in the formula is indicated according to the requirements of individual or groups of animals.

A further object of the invention is to provide a disk type feed blender having a series of units in side by side relation and with each unit having a hopper adapted to contain a specific material or foodstuff and intended to discharge such material onto a disk with the flow of the material being measured and controlled accurately.

A still further object of the invention is to provide a disk type feed blender having a mixing chamber containing an auger which mixes, moves and discharges the material onto an adjustable lifting auger which conveys the material upwardly to a different elevation for ease of handling.

Figure 13:
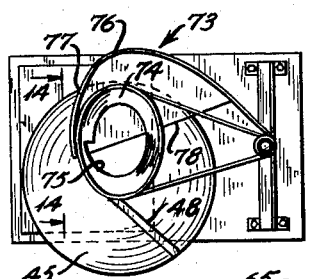
Figure 12:
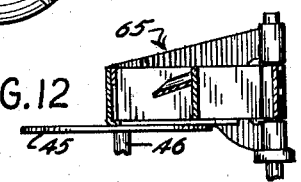
Figure 14:
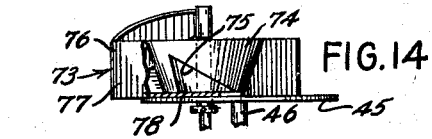
Figure 3:
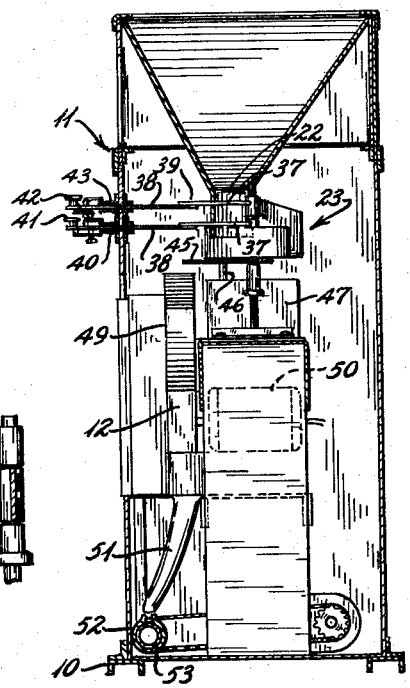
Figure 4:
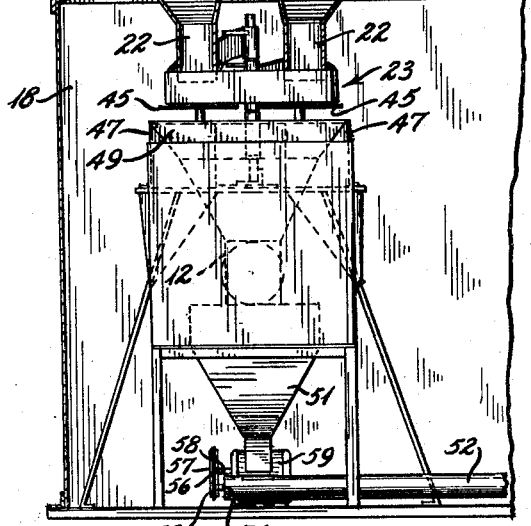
Figure 6:
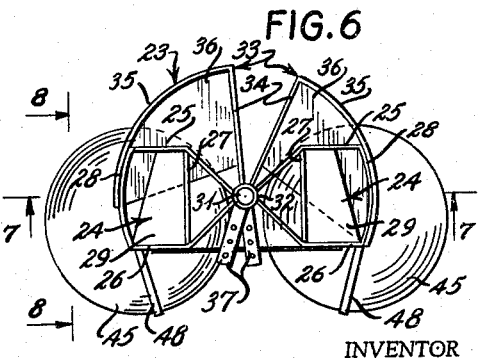

Other objects and advantages of the invention will be apparent from the following description taken in conjunction with the accompanying drawings in which:

FIG. 1 is a perspective illustrating one application of the invention;

FIG. 2, another perspective with the cover panels removed;

FIG. 3, an enlarged vertical section on the line 3—3 of FIG. 2;

FIG. 4, an enlarged vertical section at right angles to that of FIG. 3 on the line 4—4 of FIG. 2;

FIG. 5, an enlarged perspective of the volume control mechanism of FIGS. 3 and 4;

FIG. 6, a plan view of the volume control mechanism of FIG. 5;

FIG. 7, a vertical section on line 7—7 of FIG. 6;

FIG. 8, a view on line 8—8 of FIG. 6;

FIG. 9, an enlarged perspective of one of the blender units of FIGS. 1 and 2;

FIG. 10, a perspective from the opposite direction of that of FIG. 9;

FIG. 11, an enlarged plan view of the volume control mechanism used in the blender unit of FIGS. 9 and 10;

FIG. 12, a vertical section on the line 12—12 of FIG. 11;

FIG. 13, a plan view of a modified form of volume control mechanism;

FIG. 14, a section on line 14—14 of FIG. 13;

FIGS. 15 and 16, a perspective and a vertical section of the volume of flow regulating and indicating means; and FIG. 17, an enlarged fragmentary detail of the conveyor mechanism on the line 17—17 of FIG. 1.

Briefly stated the present invention is a disk type feed blender which includes a plurality of units arranged in side by side relation and such units are of two basic types, one of which is adapted to accommodate grains of various types and is provided with a conventional hammermill to comminute the grain into particle size for more thoroughly blending with granular materials from other units. Each unit includes a hopper for material which discharges the material downwardly into a feed box having an inclined bottom for discharging such material from one side thereof. The discharge side of the feed box has a tapered opening the size of which is regulated by a control gate or slide operated from a remote position exteriorly of each unit. The material discharged from the feed box falls by gravity onto a rotating disk and is caused to be discharged therefrom by a scraper and subsequently is discharged either into a hammermill or directly into a mixing chamber where it is mixed, moved and discharged from one end of the machine. The discharge from the machine is relatively close to the floor and in order to more easily handle the material an adjustable lifting auger is provided which conveys the material upwardly to a different elevation where it may be packaged or transferred.

With continued reference to the drawings, the disk type feed blender of the present invention includes a base 10 on which a plurality of blender units are mounted. The blender units are of two basic types, the first type 11 having a hammermill 12 of known construction for comminuting grain such as corn, barley, oats, wheat or the like into smaller particle size, and the second type 13 adapted to contain granular foodstuffs such as alfalfa meal, flour tankage, dried meat scraps, fish meal, linseed meal, soy bean meal, cottonseed meal, bone meal or the like which do not require further reduction in size.

As illustrated, the unit 11 is a double blender having a pair of hoppers 14 each of which has a level indicator 15 with an operating handle 16 on one end and an electrical contact switch 17 on the opposite end. The switch 17 may be connected to a signaling device (not shown) to warn the operator that the supply of material is getting low, or if desired the switch may be connected to a supply auger to automatically maintain a substantially constant level of material within the hoppers 14. The unit 11 is provided with a casing or housing 18 including an access door or panel 19 and an electrical panel 20 with a plurality of contact switches 21 for controlling the flow of electrical energy to the various units.

The hoppers 14 are adapted to contain grain or the like and such grain is fed downwardly by gravity through a discharge neck or opening 22 into a volume control mechanism 23. The volume control mechanism 23 includes a pair of opposed feed boxes 24 each of which has side walls 25 and 26, an inner end wall 27 and an outer arcuately disposed end wall 28. Each feed box has a bottom 29 inclined downwardly from the wall 27 toward the arcuate wall 28 in such a manner that material falling into the feed boxes will be directed toward the arcuate wall. The arcuate wall 28 is provided with a tapered opening 30 which increases in size from the side wall 25 toward the side wall 26 in such a manner that a greater amount of material will flow through the opening adjacent to the wall 26.

In order to control the flow of material through the opening 30 a post 31 is located intermediate the feed boxes 24 and such post receives a pair of sleeves 32 rotatably mounted on the upper end of such post. A cut-off gate 33 is fixed to each of the sleeves and includes a generally radial member 34 connected at its outer end to an arcuate member 35, located in close proximity to the arcuate wall 28 of the feed boxes, and a bottom 36 disposed below the level of the feed boxes. In order to control the position of the gate 33 each of the sleeves 32 is provided with an outwardly extending lug or projection 37 to which a flow regulating arm 38 is fixed by fasteners 39 or the like. The arms 38 extend outwardly through openings 40 in the housing 18 and the free end of each of the arms is provided with an operating knob 41. An indicator 42 is mounted on each of the arms 38 adjacent to the knob 41 and such indicator extends inwardly to a position overlying an indicator plate 43 mounted on the housing 18 and having indicia 44 thereon indicating the position of the gate 33 and the amount of material which can flow through the opening 30 in each of the feed boxes.

The material discharged through the opening 30 falls by gravity onto a disk 45 mounted on a shaft 46 rotated by a variable speed motor and gear reduction 47. In order to discharge the material from the disk a scraper 48 is mounted on the feed box 24 and is in engagement with the upper surface of the disk 45 so that when the disk rotates the material thereon will engage the scraper and will be discharged therefrom. The material thus discharged will fall by gravity into a hopper or chute 49 and will be directed into the hammer mill 12 which is driven by an electric motor 50 or the like. Materials from both of the hoppers 14 are discharged into the same hopper 49 and are premixed and blended as they are fed into the hammer mill which reduces the material to relatively small particles.

After the material has been comminuted in the hammer mill it is discharged into a chute 51 which directs the material downwardly into a mixing chamber 52 having a screw or auger 53 for moving the material toward the discharge end of the machine while mixing and blending the materials within the mixing chamber with any materials subsequently introduced from the other units. The auger 53 has a shaft 54 extending outwardly from one end of the mixing chamber and such shaft receives a pulley 55 driven by a belt 56 from a pulley 57 mounted on the shaft 58 of a motor 59.

It will be understood that whereas the unit 11 has been illustrated and described as a double unit with a single hammer mill, this unit could be constructed of two separate units each having its own individual hammer mill. Also this unit is not limited to two hoppers but could have a plurality of hoppers or a plurality of individual hoppers and hammer mills connected in alignment and adapted to contain separate grains or combinations of grains or any other material to be comminuted prior to blending with granular foodstuffs.

A plurality of units 13 of the second type are mounted on the base 10 and each of these units includes a frame 62 and a hopper 63 having a discharge 64. The hoppers 63 are adapted to contain granular materials with the hopper of each unit containing an individual material or a specific blend of materials. Each of the hoppers feeds material downwardly through the discharge 64 into a volume control mechanism 65 which is identical with one-half of the volume control mechanism 23 previously described and includes a feed box 24, a post 31, a sleeve 32, an operating gate 33, a lug or projection 37 and an indicating arm 38, all as previously described. The material is discharged from the feed box 34 onto a disk 45 operated by a motor and gear reduction 47 and is discharged from the disk by a scraper 48 into a chute 66 where it is introduced through openings 67 into the mixing chamber 52. The frame 62 may have panelling 68 mounted thereon and if desired such panelling may have inspection windows 69 for observing the flow of material into the mixing chamber.

As illustrated in FIGS. 13 and 14 a modified form of volume control mechanism 73 is disclosed and includes a generally oval feed box 74 having tapered walls and with a tapered opening 75 located along one of the elongated walls of the oval. A flow control gate 76, of substantially the same configuration as the side of the feed box with the inclined opening, has a portion 77 and a bottom 78 in close proximity to the bottom of the oval feed box 74, the gate 76 being operated in substantially the same manner as the gates previously described.

The discharge end of the mixing chamber 52 is connected to a sleeve 80 mounted on the end of the housing 18 by a flange 81 fixed to the sleeve 80 intermediate its length and secured to the housing by fasteners 82. The free end of the auger 53 extends through the sleeve 80 and projects slightly beyond the free end thereof. Since the discharge end of the mixing chamber is located adjacent to the floor level it is desirable to provide a conveyor mechanism 83 which receives material from the mixing chamber and raises such material to a higher elevation for packaging or transfer. In order to connect the conveyor mechanism 83 with the mixing chamber, the free end of the sleeve 80 is provided with a generally U-shaped vertically disposed member 84 having a web portion 85 with an opening 86 therein in alignment with the sleeve 80 and a pair of flanges 87 which project outwardly from the web portion 85. The conveyor mechanism 83 includes a trap member 88 of generally U-shaped construction and having its lower portion closed by an end member 89. The legs of the U-shaped trap member 88 are pivotally connected to the flanges 87 of the U-shaped member 84 in such a manner that the trap member 88 can pivot in one direction relative to the mixing chamber. A band 90 is formed of an integral piece of the trap member 88, or is formed as a separate piece and connected to the upper edge of such trap member for a short distance. The free ends of the band 90 are provided with outwardly turned flanges 91 adapted to accommodate bolts or other fasteners 92 in such a manner that when the bolts are tightened the band will clamp a tubular housing 93 in which an auger 94 is disposed. The auger extends upwardly through the housing 93 and has a shaft 95 extending outwardly of the free end thereof and such shaft receives a pulley 96 driven by a belt 97 from a drive pulley 98 mounted on a shaft 99 and driven by a motor 100 to cause the auger to rotate and to lift the material discharged from the mixing chamber into the trap member 88. A discharge chute 101 is mounted on the upper end of the housing 93 and such chute is adapted to discharge the material which has been raised by the auger.

In the operation of the device, grain such as cort, oats, wheat, barley or the like is introduced into the hoppers 14 of the unit 11 and granular foodstuffs such as alfalfa meal, soy bean meal or the like is introduced into the hopper 63 of each of the units 13. The volume control mechanisms 23 and 65 are adjusted to the desired ratio of each of the materials which they control after which the blending operation is started by activation of the switches 21 which control each of the units. The grain in the hoppers 14 is fed downwardly through the feed boxes 24 and onto disks 45 and thereafter into the hammer mill 12 where the grains are premixed and comminuted and then discharged into the mixing chamber 52. As the grain is transferred through the mixing chamber by the auger 53, granular materials from the hoppers 63 are fed downwardly through the volume control mechanisms 65 and discharged through chutes 66 into the mixing chamber where they are thoroughly blended with the grains and with other granular materials.

The proportions of each material are regulated in accordance with a predetermined scientifically prepared formula for an individual animal or group of animals and can be altered to meet the requirements of a new formula while the blender continues to operate. This is accomplished for each unit by merely moving the arm 38 and indicator 41 to a new setting on the indicator plate 42 which in turn will alter the position of the volume control gate 33 relative to the tapered opening 30 of the feed box.

It is contemplated that each of the grain units 11 may have individual hoppers and hammer mills so that two or more hoppers may feed material into a common hammer mill where the grains will be preblended. Also, it is contemplated that the granular material units 13 may be constructed as complete individual units which can be sold separately so that a farmer or feed mill operator can purchase and install as many units as his individual needs require.

It will be apparent that a relatively simple disk type blender has been provided having a series of units connected in side by side relation for accommodating a plurality of foodstuffs to be blended, and each of such units has a volume control mechanism including a feed box having a tapered discharge opening and a movable gate to regulate the flow of material therethrough. Each volume control mechanism includes a rotatable disk which receives the discharge from the feed box and a scraper for removing the material from the disk and directing such material into the mixing chamber.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A disk type blender for integrating a plurality of feeds in exact proportions according to a predetermined formula comprising a housing, at least one grain unit and at least one granular material unit located within said housing, each of said units having hopper means for containing material to be blended, volume control means including a feed box for receiving material from said hopper, said feed box having a tapered discharge opening in one side, an adjustable gate regulating the flow of material through said discharge opening, means exteriorly of said housing for controlling the position of said gate relative to said discharge opening, a disk for receiving material from said feed box, scraper means carried by said feed box and extending transversely of said disk and in engagement with the upper surface thereof for discharging material therefrom, a mixing chamber located below said disks and adapted to receive material from each of said units, and an auger in said mixing chamber for blending and transferring said materials.

2. The structure of claim 1 including a hammer mill in said grain unit located intermediate said disk and said mixing chamber.

3. The structure of claim 1 having a conveyor mechanism mounted on the discharge end of said mixing chamber and including a trap member, a tubular housing adjustably connected to said trap member, auger means in said tubular housing, and a discharge chute mounted adjacent to the free end of said tubular housing for discharging material therefrom.

4. Apparatus for blending feed materials for livestock comprising a base, a housing on said base, a plurality of hoppers in said housing, volume control means for each of said hoppers including a feed box having wall structure with a tapered discharge opening therein, an adjustable gate regulating the flow of material through said discharge opening, means for controlling the position of said gate relative to said opening, a rotatable disk adapted to receive material discharged from said opening, fixed scraper means extending generally radially of said disk and in engagement with the upper surface thereof for discharging material therefrom, a mixing chamber receiving material discharged from each of said disks, and means in said mixing chamber for blending and transferring said materials.

5. Apparatus for regulating the flow of granular material comprising hopper means, a feed box for receiving material from said hopper means, said feed box having a tapered opening therein for discharging material therethrough, an adjustable gate adjacent to said feed box for regulating the size of said opening and controlling the flow of material therethrough, a rotatable disk adapted to receive material discharged through said opening, means for rotating said disk, and means for discharging material from said disk.

6. Apparatus for blending feed materials comprising a base, a mixing chamber on said base, a plurality of blender units mounted on said base, each unit including hopper means, a feed box for receiving material from said hopper means, said feed box having a tapered opening through which material is discharged, a gate located adjacent to said tapered opening, said gate and said feed box being adjustable relative to each other to regulate the size of the opening and control the flow of material therethrough, a rotatable disk adapted to receive material discharged through said opening, and means for discharging material from each of said disks into said mixing chamber.

7. A feed blender unit comprising hopper means, a feed box for receiving material from said hopper means, said feed box having an opening for discharging material, an adjustable gate located adjacent to said feed box for regulating the size of said feed box opening and controlling the flow of material therethrough, a rotatable disk adapted to receive material discharged through said opening, and means for discharging material from said disk into a mixing chamber.

References Cited by the Examiner
UNITED STATES PATENTS 3,145,644  8/64  Johnson _____ 241—81 X J. SPENCER OVERHOLSER, *Primary Examiner.*